United States Patent [19]

Matson

[11] 4,140,205

[45] Feb. 20, 1979

[54] SAFETY RELEASE BOAT TRAPEZE HOOK

[76] Inventor: Theodore C. Matson, 7025 Seaside Walk, Long Beach, Calif. 90803

[21] Appl. No.: 886,737

[22] Filed: Mar. 15, 1978

[51] Int. Cl.² .................. A62B 35/00; B63C 9/26
[52] U.S. Cl. .................... 182/3; 24/230 A; 115/6.1; 9/14
[58] Field of Search ............ 182/3; 114/39, 253; 115/6.1; 9/14, 336; 24/230 A, 230 AP

[56] References Cited

U.S. PATENT DOCUMENTS

| 1,607,085 | 11/1926 | Kilstrom | 24/230 A |
| 2,699,284 | 1/1955 | Rose | 182/3 |
| 3,317,936 | 5/1967 | Johnson | 9/14 |
| 3,324,818 | 6/1967 | Dunlap | 115/6.1 |
| 4,047,255 | 9/1977 | Kiefer | 115/6.1 |

Primary Examiner—Reinaldo P. Machado
Attorney, Agent, or Firm—Fulwider, Patton, Rieber, Lee & Utecht

[57] ABSTRACT

A safety release boat trapeze hook for use on sailboats with conventional trapeze equipment. The safety release hook includes a harness frame to which a hook assembly for attachment to a trapeze line ring is selectively latched by means of a latch release mechanism. A retaining strap is also provided for holding the ring on the hook.

4 Claims, 5 Drawing Figures

SAFETY RELEASE BOAT TRAPEZE HOOK

BACKGROUND OF THE INVENTION

1. Field of the Invention

The present invention relates generally to trapeze hooks for trapeze equipment for sailboats and, more particularly, to such a trapeze hook in which the trapeze line ring may be substantially conventionally attached to and removed from the hook but, additionally, the entire hook assembly may be quickly released from the harness equipment when safety is in question.

2. Description of the Prior Art

In the past, trapeze hooks have simply been hooks attached to frames to which the straps of the harness are attached. While the hook mechanism itself may be designed for relatively easy release of the ring of the trapeze line, these mechanisms are basically constructed to retain the ring in the hook structure when the trapeze line is slack. Thus, there have been occasions when, due to the taught trapeze line, the ring has been difficult or impossible to remove from the hook mechanism, resulting in accidents and injuries to the person attached to the trapeze line. Thus, there has been a need for some means to reliably, quickly and safely detach a person from the trapeze line. The present invention satisfies that need.

SUMMARY OF THE INVENTION

The present invention provides a safety release trapeze hook which includes a harness frame and hook assembly by which a person can attach and detach the trapeze line ring under normal conditions, but also provides a quickly and easily operated latch release mechanism which can detach the entire hook assembly and latch release from the trapeze harness frame.

The trapeze hook of the invention includes a frame for attachment to the harness straps and slide channels for receiving a selectively latched slider which carries the hook itself. The slider is latched into position by means of a latch release plate including tongues which lock into slots on the frame and an finger tab by which the slider can be quickly unlatched, allowing the hook to be released from the frame.

A novel feature of the structure is the use of a retaining strap which is attached to the latch release plate and the hook and spring urged against the hook to provide retainment of the line ring. Further spring means are provided to urge the latch release plate tongues into the associated slots.

Thus, the trapeze hook of the present invention provides a hook structure with a retaining strap and a latch release mechanism whereby the hook may be quickly and easily released from the frame.

DESCRIPTION OF THE PREFERRED EMBODIMENT

Figure 1:
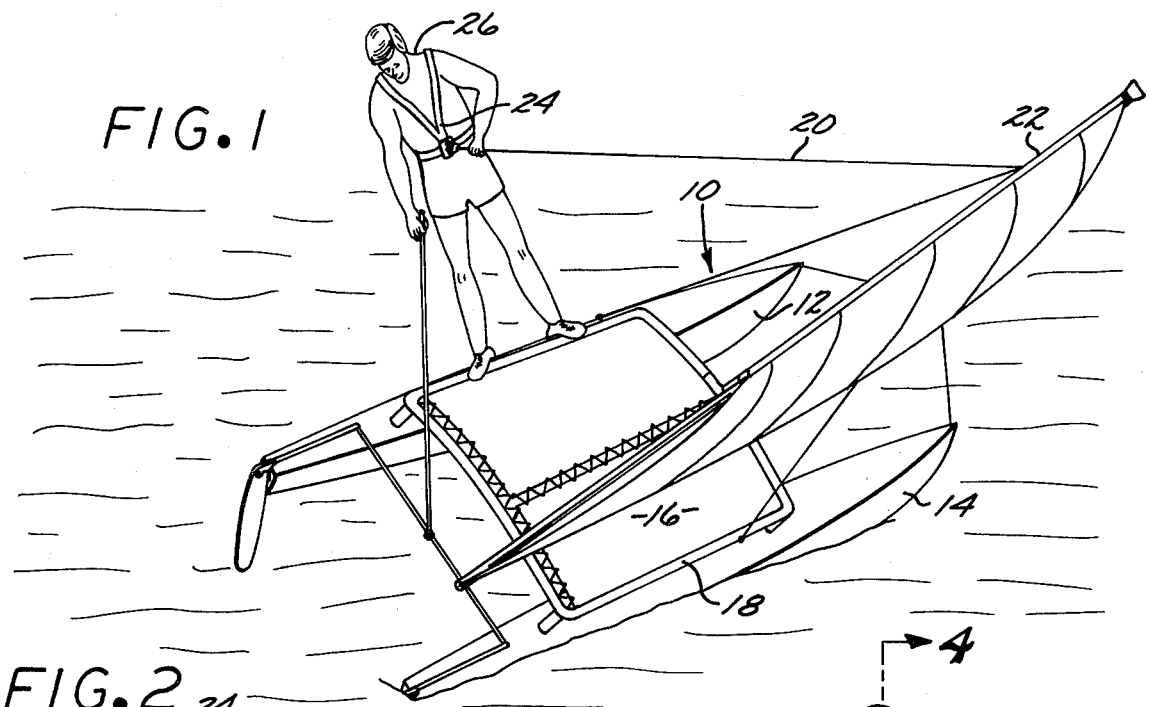
FIG. 1 is a perspective view of a catamaran-type sailboat with a person hiked out over the edge of the boat by means of a trapeze arrangement.

Referring now to the drawings, and particularly FIG. 1 thereof, a catamaran-type sailboat 10 is shown in a heeled position in which a trapeze assembly might be used. The boat generally has a pair of hulls 12 and 14 separated by a trampoline 16 including a frame 18 which is attached to the hulls 12 and 14.

Figure 2:
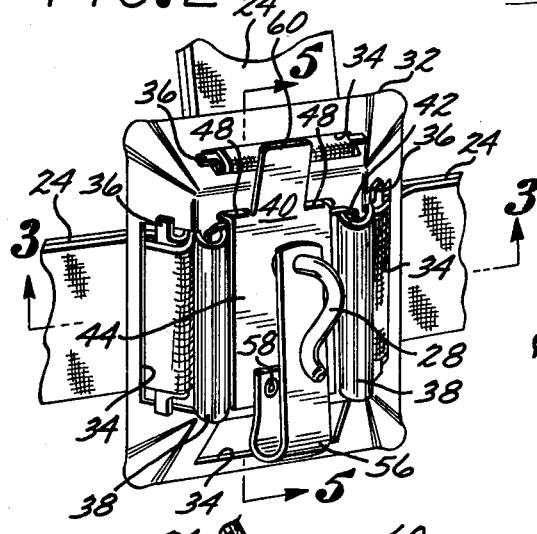
FIG. 2 is a perspective view of the safety release boat hook mechanism of the present invention.

Typically when a trapeze assembly is utilized, a trapeze line 20 is fixed at one end to a mast 22 and at the other end is detachably attached to a harness 24 worn by the sailor 26. The trapeze line 20 is connected to a ring 30, shown in phantom in FIGS. 4 and 5, that is attached to a hook 28 (FIG. 2) fixed to the harness 24. In the hook mechanism of the present invention, the harness straps 24 are attached to a generally square frame 32 with its sides bent down and provided with slots 34 and associated buckle slides 36 to provide for attachment of the straps 24. Frame 32 is also provided with a pair of slide channels 38 constructed by bending over the removed metal provided when the slots 34 were constructed.

Figure 3:
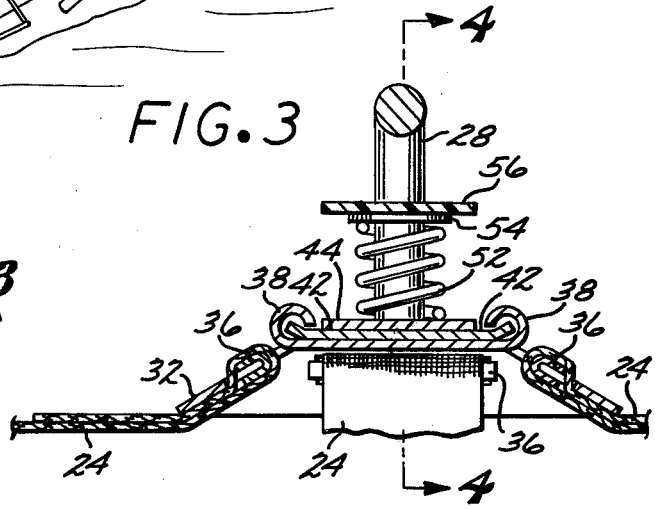
FIG. 3 is an enlarged sectional view of the mechanism taken in the direction of lines 3—3 of FIG. 2.
Figure 4:
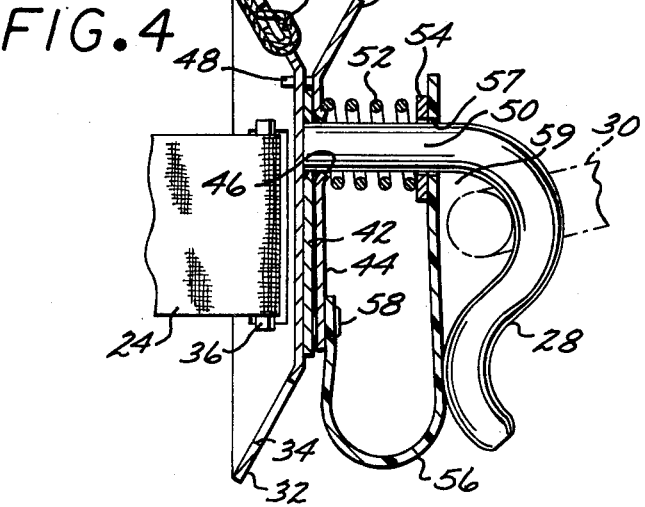
FIG. 4 is an enlarged sectional view of the mechanism taken in the direction of lines 4—4 of FIG. 3.

A sliding hook assembly, generally designated 40 includes a slider 42, best seen in FIG. 3, having edges which slide between the channels 38 and on which is attached the hook 28 by conventional means such as welding. Overlying the slider 42, but not physically attached to it, is a latch release plate 44 having an aperture 46 (FIG. 4) through which the hook 28 passes. At its upper end, the release plate 44 includes a pair of tongues 48 which are inserted into the slots 50, as best seen in FIGS. 4 and 5, to maintain the slider 42 and attached hook within the channels 38.

Positive positioning of the latch release plate with the tongues 48 within the slots 50 is provided by means of a compression spring 52 and associated washer 54 that is swaged to the upper horizontal run 55 of hook 28. Spring 52 provides a resilient force between the washer 54 and the upper free end of latch release plate 44. A generally J-shaped restraining strap 56 is formed at its upper end with an aperture 57 that receives the hook run 55 outwardly of washer 54. As shown in FIGS. 4 and 5, restraining strap 56 depends downwardly adjacent the point of hook 28 and is bent backwardly upon itself and is attached to the lower end of the release plate 44 by means of rivets 58, or the like. The restraining strap 56 is resilient and normally retains the ring 30 within the hook 28 even when tension on the trapeze line 20 is released. Ring 30 may be released from the space 59 between hook 28 and strap 56 by forcing such ring downwardly along strap 56, the strap flexing backwardly to permit such ring movement.

Figure 5:
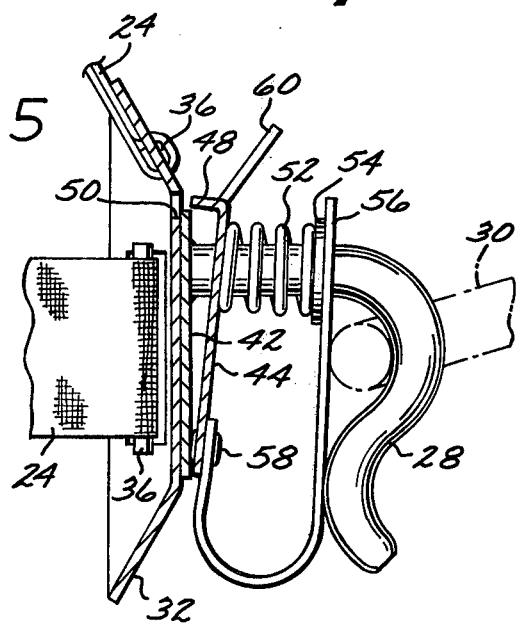
FIG. 5 is an enlarged sectional view of the mechanism taken in the direction of lines 5—5 of FIG. 2.

The release plate 44 is also provided at its upper end with a release tab 60 by which the entire hook assembly 40 may be released from within the channels 38 quickly and easily when necessary, by simply pushing the tab 60 away from the wearer's body to move the tongues 48 out of the slots 50 as illustrated in FIG. 5. Thereafter, hook assembly 40 can be raised upwardly away from frame 32.

Thus, while the safety release boat trapeze hook of the present invention not only provides a means for substantially conventional utilization of the hook 28 with the ring 30, but also provides for the quick release of the entire hook assembly 40 when necessary for safety purposes.

While the trapeze hook mechanism of the present invention has been described in detail above, the invention is not to be limited except by the following claims.

I claim:

1. In a trapeze system including a trapeze line connected to a ring, and a harness worn by a sailor, the improvement comprising:

a frame attached to said harness, said frame including a slide channel and associated latch slots;

a hook assembly including a slider having edges which slide within said slide channel and tongues insertable within said slots to lock said slider to said frame;

a hook secured at one end to said slider;

a latch release plate overlying said slider and secured thereto for movement towards and away therefrom;

spring means interposed between said latch release plate and said hook to normally resiliently urge said latch release plate towards said slider and maintain said tongues within said slots;

a tab on said latch release plate for effecting manual movement of said latch release plate away from said slider to release said tongues from said slots to free said tongues from said slots whereby said slider may be withdrawn from said frame; and restraining strap means releasably retaining said hook to said ring.

2. The improvement defined in claim 1, wherein:

said latching slots are positioned adjacent an end of said slide channel;

said slide is a plate from which said hook extends outwardly;

said latching means includes a latch release plate overlying said slide with said hook extending outwardly through an aperture in said latch release plate; and said latch release plate further includes at an end thereof a pair of tongues which cooperate with said latching slots to fix the position of said slide within said slide channel.

3. The improvement defined in claim 2, wherein:

said retaining strap has one end attached to said hook and the other end attached to an end of said latch release plate opposite to that of said tongues.

4. The improvement defined in claim 3, wherein:

said retaining strap is generally J-shaped and is resilient so as to flex backwardly to permit removal of said ring from said hook.

* * * * *